(12) United States Patent
Cooper et al.

(10) Patent No.: US 7,640,218 B2
(45) Date of Patent: Dec. 29, 2009

(54) EFFICIENT METHODS FOR TEMPORAL EVENT CLUSTERING OF DIGITAL PHOTOGRAPHS

(75) Inventors: Matthew L. Cooper, San Francisco, CA (US); Andreas Girgensohn, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1250 days.

(21) Appl. No.: 11/037,378

(22) Filed: Jan. 18, 2005

(65) Prior Publication Data

US 2006/0173746 A1 Aug. 3, 2006

(51) Int. Cl.
*G06N 5/00* (2006.01)
(52) U.S. Cl. .......................................... 706/20; 706/46
(58) Field of Classification Search .................. 706/20, 706/46; 707/4; 382/128
See application file for complete search history.

(56) References Cited

U.S. PATENT DOCUMENTS

| | | | |
|---|---|---|---|
| 6,542,869 B1 | 4/2003 | Foote | 704/500 |
| 2003/0048946 A1 | 3/2003 | Foote et al. | |

OTHER PUBLICATIONS

Pending U.S. Appl. No. 10/114,891, filed Dec. 9, 2003, Matthew Cooper.
Cooper, Matthew, et al., "Temporal Event Clustering for Digital Photo Collections," MM '03, Nov. 2-8, 2003, Berkeley, CA, USA, 10 pp.
Cooper, Matthew, et al., "Automatically Organizing Digital Photographs Using Time and Content," Proc. IEEE Intl. Conf. on Image Processing, Sep. 14, 2003, 4 pp.
Cooper, Matthew, et al., "Scene Boundary Detection via Video Self-Similarity Analysis," Proc. IEEE Intl. Conf. on Image Processing (2001), pp. 378-381.
Girgensohn, Andreas, et al., "Simplifying the Management of Large Photo Collections," Human-Computer Interaction Interact '03, I0S Press, 2003, pp. 196-203.
Goodwin, Michael M., et al., "Audio Segmentation by Feature-Space Clustering Using Linear Discriminant Analysis and Dynamic Programming," 2000 IEEE Workshop on Application of Signal Processto Audio and Acoustics, Oct. 19-22, 2003, New Paltz, NY, pp. 131-134.
Graham, Adrian, et al., "Time as Essence for Photo Browsing Through Personal Digital Libraries," Proc. Joint Conf. on Digital Libraries, Jul. 13-17, 2002, Portland, OR, USA, 10 pp.
Hansen, Mark H., et al., "Model Selection and the Principle of Minimum Description Length.," J. of the American Statistical Assoc. (2001), 96(454):746-74, pp. 1-50.
Hartigan, John, "Partition by Exact Optimization," Chap. 6, "Clustering Algorithms," Wiley & Sons, 1975, pp. 130-142.

(Continued)

*Primary Examiner*—Wilbert L Starks, Jr.
(74) *Attorney, Agent, or Firm*—Morgan, Lewis & Bockius LLP (57) ABSTRACT

Techniques for reducing the computational complexity of conventional similarity-based approaches for temporal event clustering of digital photograph collections include one or more approaches to select boundaries based on dynamic programming and the Bayes information criterion. Each method performs competitively with conventional approaches and offer significant computational savings.

24 Claims, 7 Drawing Sheets

OTHER PUBLICATIONS

Jaimes, Alejandro, et al., "Discovering Recurrent Visual Semantics in Consumer Photographs," Proc. IEEE Intl. Conf. on Image Processing, 2000, 4 pp.

Ji, Xiang, et al., "Domain-independent Text Segmentation Using Anisotropic Diffusion and Dynammic Programming.," Proc. ACM SIGIR, 2003, pp. 322-329.

Loui, Alexander C., et al., "Automated Event Clustering and Quality Screening of Consumer Pictures for Digital Albuming," IEEE Transactions on Multimedia, vol. 5, No. 3, Sep. 2003, pp. 390-402.

Loui, Alexander C., et al., "Automatic Image Event Segmentation and Quality Screening for Albuming Applications," IEEE International Conference on Multimedia and Expo., Jul. 2000, New York City, NY, 4 pp.

Mosjsilović, Aleksandra, et al., "ISee: Perceptual Features for Image Library Navigation," Proc. SPIE Human Vision and Electronic Imaging, 2002, 12 pp.

Naaman, Mor, et al., "Automatic Organization for Digital Photographs with Geographic Coordinates," JCDL '04, Jun. 7-11, 2004, Tuscon, Arizona, USA, pp. 53-62.

EFFICIENT METHODS FOR TEMPORAL EVENT CLUSTERING OF DIGITAL PHOTOGRAPHS

BACKGROUND OF THE INVENTION

1. Field of the Invention

The present invention relates to methods for clustering digital photograph collections.

2. Description of the Related Art

Digital cameras are coming into widespread use, and as a result, consumers are amassing increasingly large collections of digital photographs. There is a need for automatic tools to help manage, organize, and browse these collections. While a number of tools now exist for consumer photograph management, the vast majority feature light tables of thumbnails in chronological order. However, users typically group photographs chronologically into clusters based on "event."

Clustering photographs chronologically based on "event" is equivalent to partitioning the time interval over which the photographs were taken. Selecting boundaries at a single level from a hierarchical set of event boundaries can result in quadratic computational complexity in the number of photographs. As a consequence, processing times can be many seconds or even minutes to partition large photograph collection. This limits the suitability of these methods for interactive applications.

SUMMARY OF THE INVENTION

This work is related to scale-space analysis and its application to the segmentation of text and video streams. In scale-space analysis, difference features are extracted from a data set and examined after smoothing with Gaussian kernel functions of varying standard deviation. The multiple smoothing filters reveal boundaries at the varying scales. The boundaries are detected and traced back from fine to coarse scale. Final segment boundaries are selected according to different criteria including the strength and extent of the maxima over the scales. This information can be used to construct a final flat (identifying only the points in the data where the context has changed) or hierarchical (detecting not only an event but also sub events within that event) segmentation.

In this invention, event-based clustering of data files can be addressed using methods based on dynamic programming (DP) and Bayes information criterion (BIC). Data files comprise intrinsic information stored together with meta-data tag information, where the meta-tag relates to the parameters used to store the intrinsic information. For example, the data file of a digital photograph includes the intrinsic information relating to the pixels that make up the photograph and a meta-data tag which can include the type of file, the size of the file, a time stamp, and global positioning satellite positional data indicating the location where the photograph was taken. In the case of digital photographs, the DP and BIC methods perform the task significantly faster than for example similarity-based clustering criteria using similarity matrices. Although similarity analysis may be used for pre-processing to identify a set of potential event boundaries, any method can be used to pre-process.

Given a set of candidate event boundaries, the methods only require the photographs' timestamps. Alternatively meta-data tag or content-based features can be used as ordering criteria. Meta-data tags can include for example the time stamp or global positioning satellite positional data, while content-based features can include the low-level features such as color histograms or low-order discrete cosine transform coefficients. In addition, photographs can be ordered according to a non time-stamp based element (e.g., meta-data or content-based features), while a comparison can still be based on time-stamps or vice versa.

In an embodiment of the invention where time stamps are extracted, ordering can be carried out based on increasing or decreasing time order. In an embodiment of the invention where an alphanumeric string can be extracted, ordering can be based on the alphabetic sequence of the first, second, . . . or last letter of the alphanumeric string. Alternatively, ordering can be based on the number of characters in the alphanumeric string and the increasing or decreasing size of the string or a combination of the length of the string and alphabetic order of a character in the string. In an embodiment of the invention where the size of the file can be extracted, ordering can be based on increasing or decreasing sizes of the files alone or in combination with some of the other ordering rules mentioned above. In an embodiment of the invention where more than one element can be extracted, ordering can be based on a combination of the above ordering rules.

The present invention has been made in view of the above circumstances and provides methods for analyzing, browsing or retrieving digital photographs to determine cluster boundaries based on DP or BIC. In this manner, collections of digital photographs can be more rapidly and efficiently organized in a collection. The approach can be applied to segmentation of not only digital photographs but also other forms of media including video and audio streams. In such an embodiment, each frame in the stream of video or audio media can make up a data file in a collection of data files.

In various exemplary embodiments of the systems and methods according to this invention, a desired set of data files can be organized by examining the timestamp, ordering the data files based on the time stamp, and then comparing the time-stamps for data files but using methods to reduce computational complexity involved in clustering the photograph collections. In one embodiment, BIC can be used to accelerate the computational step thereby reducing computational complexity involved in organizing a collection of photographs. In another exemplary embodiment a DP method can be used to accelerate the computational step and reduce the computational complexity involved in organizing a collection of photographs.

BRIEF DESCRIPTION OF THE DRAWINGS

Preferred embodiments of the present invention will be described in detail based on the following figures, wherein.

The figures are more fully described in the Detailed Description of the Invention.

DETAILED DESCRIPTION OF THE INVENTION

Figure 1:
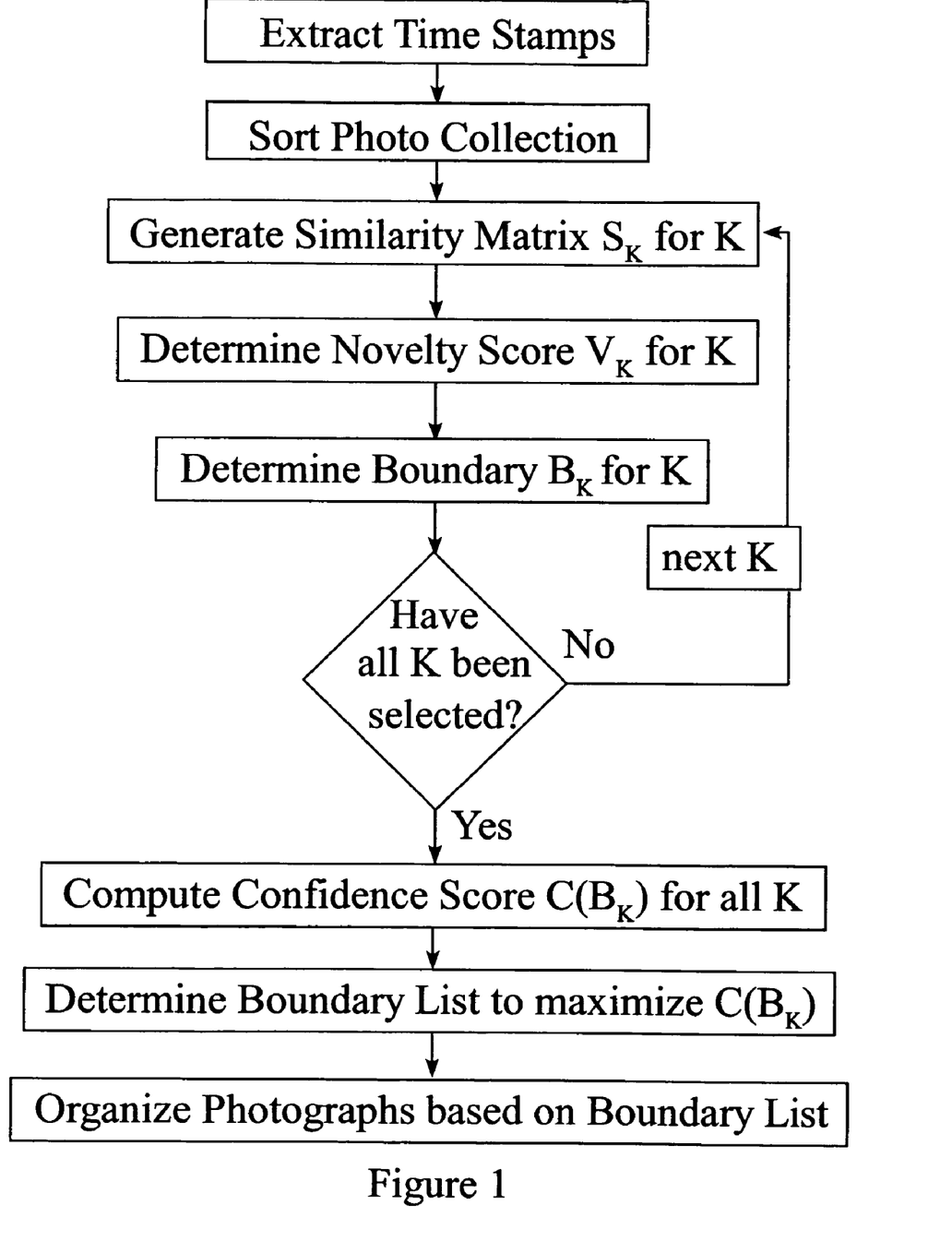
FIG. 1 illustrates a block diagram flow chart outlining a method for temporal clustering of digital photograph collections based on similarity analysis.
Figure 2:
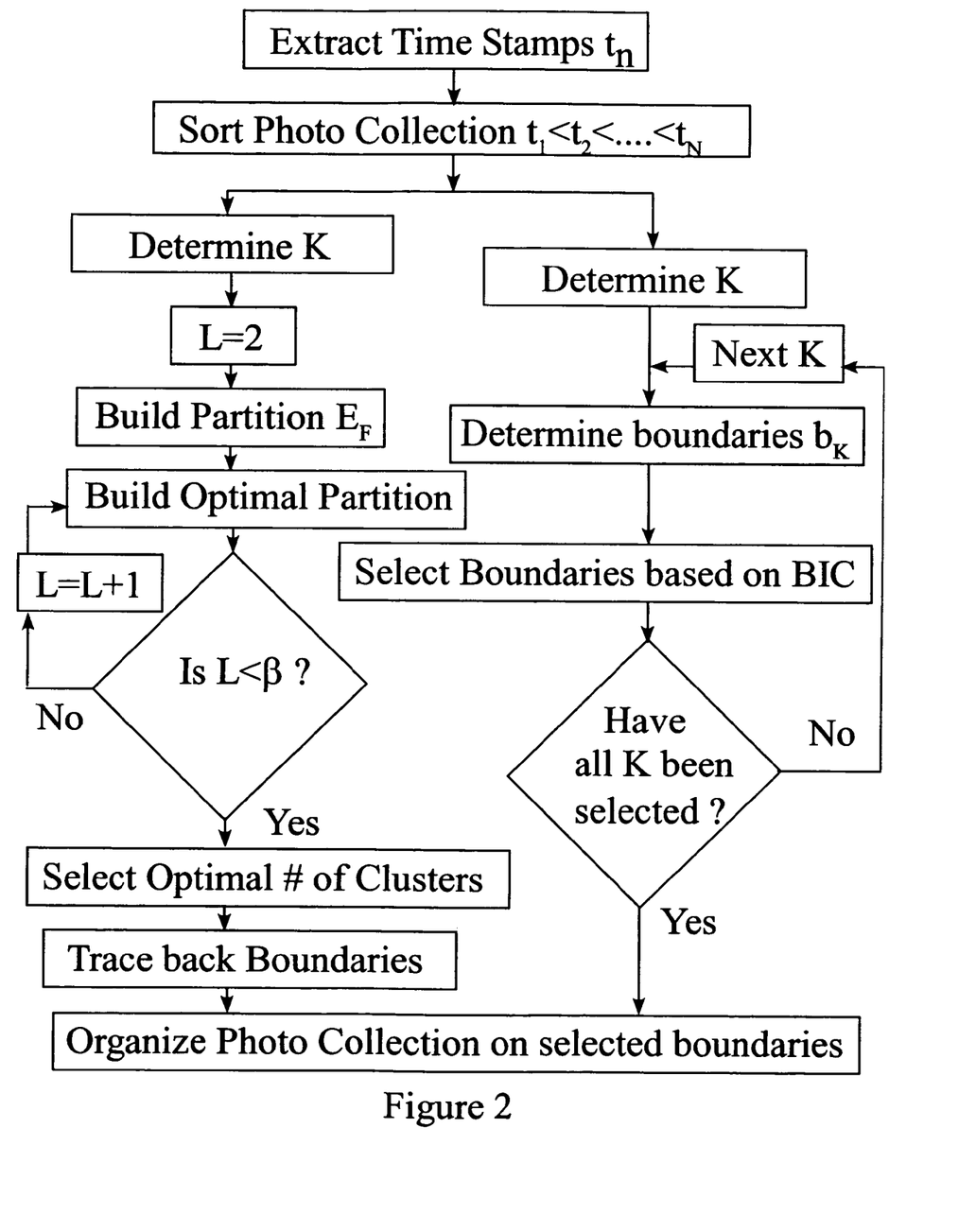
FIG. 2 illustrates a block diagram flow chart outlining a method for temporal clustering of digital photograph collections based on similarity analysis using either DP or BIC in accordance with the present invention.

As outlined in FIG. 1, temporal event clustering techniques can be based on similarity analysis. This invention discloses accelerated methods for temporal event clustering of digital photographic collections. FIG. 2 shows schematically embodiments for introducing DP or BIC methods to reduce computational complexity of temporal clustering.

Figure 3:
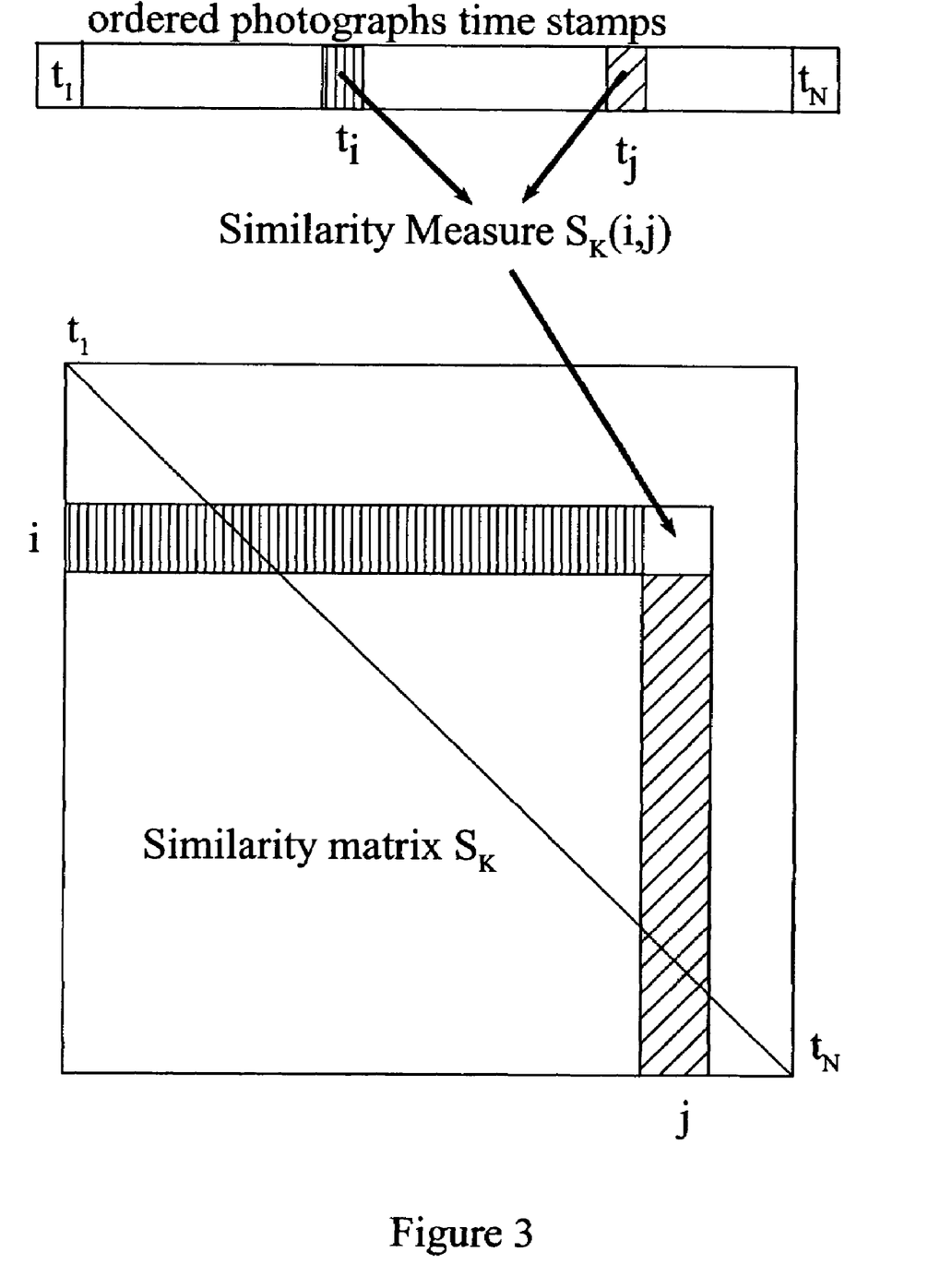
FIG. 3 illustrates embedding photograph similarity measures based on the scalar time stamps corresponding to photograph 'i' and photograph 'j', $t_i$ and $t_j$ respectively are stored in a similarity matrix $S_K(i,j)$ at row 'i' and column 'j'.

In one embodiment of the invention, similarity analysis of a collection of digital photographs can be used to determine initial boundaries. In similarity analysis a collection of digital photographs can be represented by a matrix of scale parameter K. FIG. 3 illustrates a process of embedding a digital photograph similarity measure (see equation (1)) based on a time stamp in a similarity matrix $S_K(i,j)$.

$$S_K(i,j) = \exp\left(-\frac{|t_i - t_j|}{K}\right) \quad \text{equation (1)}$$

In $S_K(i,j)$, 'i' identifies rows of a matrix and 'j' identifies columns of a matrix corresponding to entries comparing the 'i'th photograph scalar timestamp with the 'j'th photograph scalar timestamp. In this manner a family of matrices can be constructed by varying a scale parameter K over a discrete set $\kappa$, where $|\kappa|=M$, the total number of scales.

As indicated in FIG. 1, similarity matrices are used to compute a photograph indexed kernel correlation novelty score. Local maxima in a novelty score are detected as likely photograph boundaries for each K. As shown in FIG. 1, given a set of boundaries, $B_K$ corresponding to a scale K, a similarity based confidence score ($C_S$) can be calculated according to equation (2).

$$C_S(B_K) = \sum_{l=1}^{|B_K|-1} \sum_{i,j=b_l}^{b_{l+1}} \frac{S_K(i,j)}{(b_{l+1}-b_l)^2} - \sum_{l=1}^{|B_K|-2} \sum_{i=b_l}^{b_{l+1}} \sum_{j=b_{l+1}}^{b_{l+2}} \frac{S_K(i,j)}{(b_{l+1}-b_l)(b_{l+2}-b_{l+1})} \quad \text{equation (2)}$$

Figure 4:
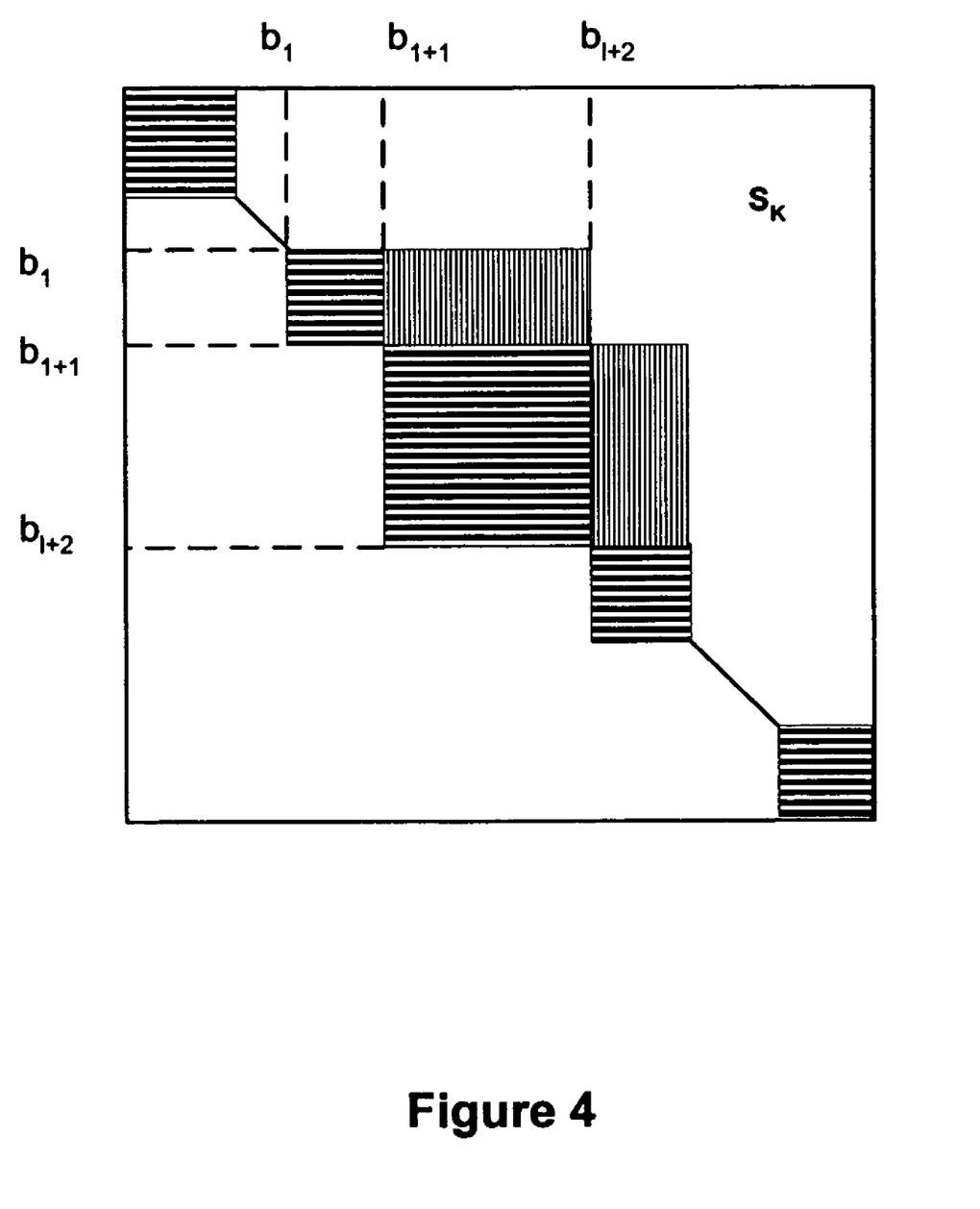
FIG. 4 illustrates the regions of the similarity matrix $S_K(i,j)$ which contribute to within cluster similarity (shaded in horizontal lines) and the regions which contribute to dissimilarity between adjacent clusters (shaded in vertical lines)

The first term in equation (2) quantifies an average within-cluster similarity between photographs, while a second term quantifies average between-cluster similarity between photographs in adjacent clusters. By negating the second term in equation (2), the confidence measure combines each cluster's average similarity and the dissimilarity between adjacent clusters. FIG. 4 illustrates this idea graphically. The within-cluster similarity terms are the means of the terms of horizontal lined regions along the main diagonal. The between-cluster terms are the means of the off-diagonal vertical lined regions. Finally, by determining maxima of the confidence score a list of optimized boundaries can be derived.

FIG. 2 shows a schematic outlining a flowchart for embodiments of methods for organizing data according to this invention. It should be appreciated that, in various exemplary embodiments, an extracted timestamp can be used to organize data chronologically. Alternatively, if, for example, an extracted element can be a meta-data element where at least one extracted element of meta-data includes a file name or some other text string the data may be organized alphabetically using meta-data or organized according to some other predetermined rule.

As shown in FIG. 2 for one embodiment of the invention, operation of a method begins with extraction of time stamps from EXIF headers for each photograph in a collection of digital photographs. If EXIF information is not available, a modification time of a digital image file can be used instead. N photographs in a collection are then ordered in time so resulting timestamps, $\{t_n : n=1, \ldots, N\}$, satisfy $t_1 \leq t_2 \leq \ldots \leq t_N$. Throughout, timestamps and rows and columns of similarity matrices are indexed by photograph in time order, not by absolute time. Thus, each photograph can be represented by its scalar timestamp.

The computation of the score of equation (2) can incur quadratic computational cost in the number of photographs. FIG. 2 details two alternative methods of reducing computational complexity of determining a list of boundaries for temporal event clustering. Introducing either DP or BIC reduces computational complexity of similarity analysis thereby more rapidly determining an optimized boundary list to organize a photograph collection.

In one embodiment of the invention computational complexity can be reduced using DP. The total set of detected boundaries can be denoted by $B=\{b_1, \ldots b_{NK}\}$ which can be the combined set of potential boundaries detected at all discrete scales K. B has cardinality $\beta=|B|<<N$. A cost of a cluster between photographs $b_i$ and $b_j$ can be defined to be an empirical variance of a corresponding timestamp according to equation (3).

$$C_F(b_i, b_j) = \frac{1}{b_j - b_i - 1} \sum_{n=b_i}^{b_j-1} \left( (t_n) - \frac{1}{b_j - b_i} \sum_{n=b_i}^{b_j-1} (t_n) \right) \quad \text{equation (3)}$$

Figure 5:
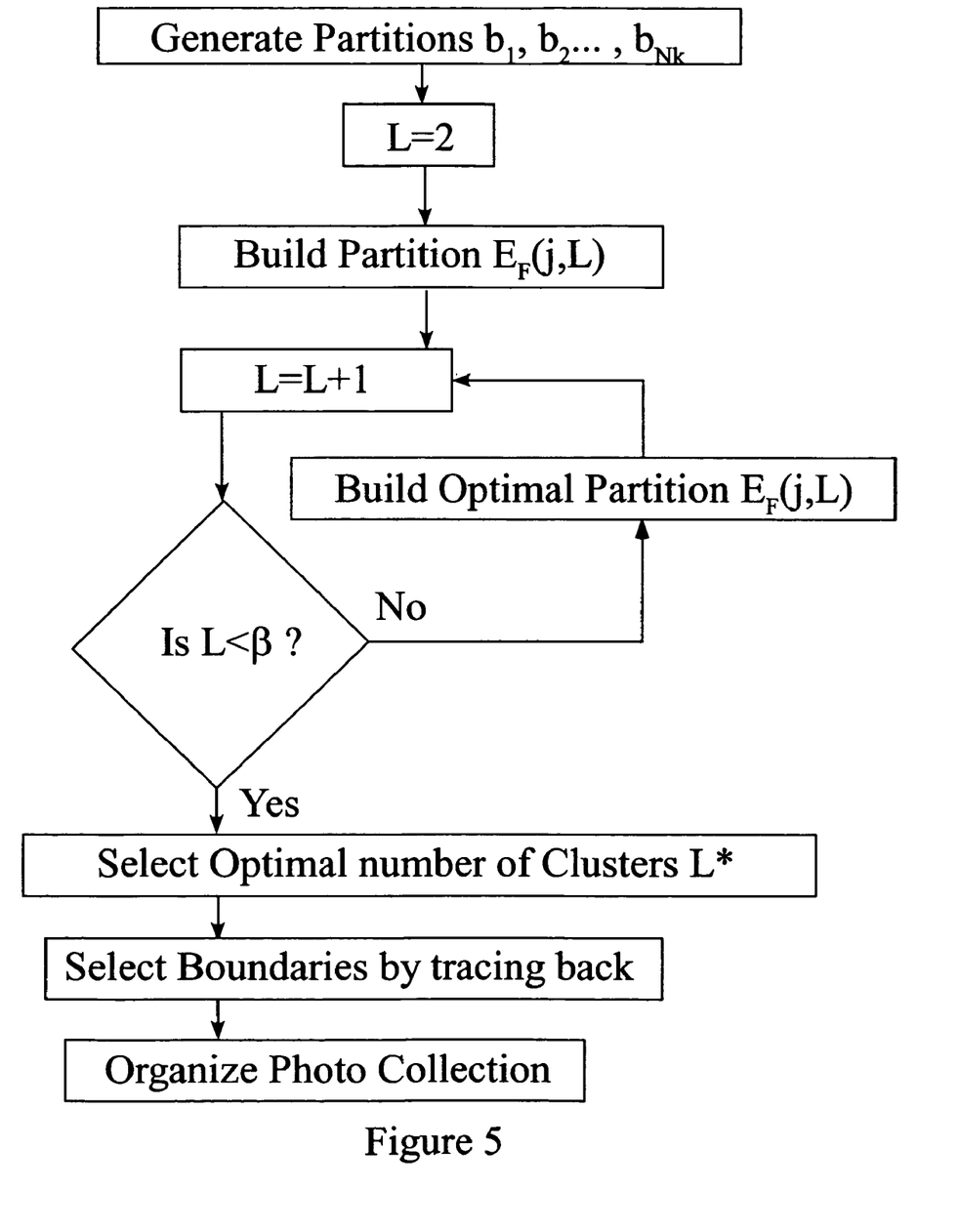
FIG. 5 illustrates a block diagram flow chart outlining a method for determining partitions and thereby the optimal number of clusters in digital photograph collections using DP in accordance with the present invention.

As shown in FIG. 5, starting with this known set of boundaries $b_1, \ldots b_{NK}$ a DP algorithm successively builds optimal partitions with m boundaries based on optimal partitions with m−1 boundaries. First, optimal partitions are computed with two clusters according to equation (4), $$E_F(j,2) = \min_{2 \leq i \leq j} \{C_F(1, b_i) + C_F(b_i, b_j)\}, \ i \leq j \leq \beta \quad \text{equation (4)}$$

where $E_F(j,m)$ can be the optimal partition of photographs with indices $1, \ldots b_j$ with cardinality m. Next, this procedure can be repeated to compute $E_F(j,L)$ according to equation (5).

$$E_F(j,L) = \min_{L \leq i \leq j} \{E_F(i, L-1) + C_F(b_i, b_j)\}, \quad \text{equation (5)}$$

$$L \leq j \leq \beta, 3 \leq L \leq \beta$$

The result can be a set of optimal partitions with cardinality $3, \ldots, \beta$. A trace back step identifies boundaries comprising each of the optimal partitions. As the number of clusters increases, the total cost of the partition decreases monotonically. A criteria for selecting the optimal number of clusters, L*, based on total partition cost can be described in equation (6).

$$L^* = \underset{2 \leq m \leq \beta - 1}{\operatorname{argmax}} \left\{ \frac{E_F(\beta, m)}{E_F(\beta, m+1)} \right\} \quad \text{equation (6)}$$

It is envisaged that one having skill in the art can utilize various other criteria to determine L*.

Figure 6:
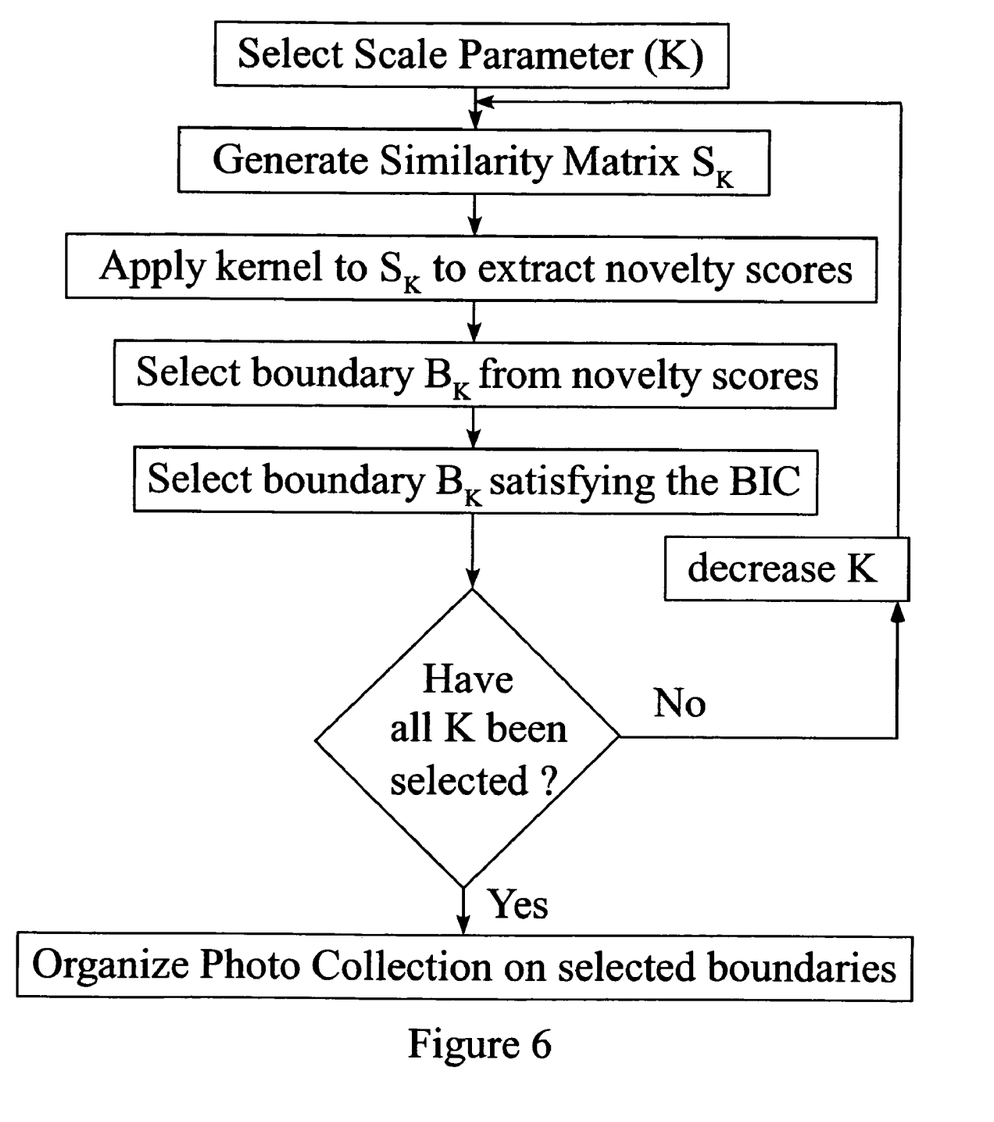
FIG. 6 illustrates a block diagram flow chart outlining a method for determining the optimum boundaries in digital photograph collections using BIC in accordance with the present invention.

In one embodiment of the invention, computational complexity can be reduced using BIC as shown in FIG. 2. A BIC is a method for model order selection, where model order can be the number of event clusters. In BIC analysis, it can be assumed that timestamps within an event are distributed normally around an event mean. As shown in FIG. 6, in one embodiment of the invention, a scalar parameter K can be determined. Next, a set of similarity matrices can be constructed for different values of K. Then a set of novelty scores can be determined via kernel correlation. From a novelty score a set of boundaries can be determined. The basic BIC process can test each boundary $b \in B$ to determine if an increase in model likelihood justifies the additional parameters used to describe the additional segment. This results in a simple test for each $b_l$ as described in expression (7).

$$L(b_{l-1}, b_l) + L(b_l, b_{l+1}) \lesssim L(b_{l-1}, b_{l+1}) + \frac{\lambda}{2} \log(b_{l+1}, b_{l-1}) \quad \text{expression (7)}$$

The left hand side of expression (7) is a log-likelihood term for a two-segment model. A two-segment model splits photographs between $b_{l+1}$ and $b_{l-1}$ into two clusters, separated by boundary $b_l$. The right hand side of expression (7) represents a log-likelihood for a single segment model, and a penalty term for additional parameters in a two-segment model. A single segment model can be a single cluster of photographs $b_{l-1}, \ldots, b_{l+1}$. In expression (7), $\lambda$ can be the number of parameters required to represent a segment. If a likelihood gain associated with separate models for the two segments exceeds the penalty for additional parameters, $b_l$ can be included in the final event partitioning. Since each segment can be described using a sample mean ($\mu_l$), and variance ($\sigma_l$) of the photographs timestamp according to equation (8), then $\lambda=2$.

$$L(b_l, b_{l+1}) = \frac{b_{l+1} - b_l - 1}{2} \log 2\pi\sigma_l - \sum \frac{(t_n - \mu_l)^2}{2\sigma_l^2} \quad \text{equation (8)}$$

Equation (8) can be further simplified to equation (9).

$$L(b_l, b_{l+1}) = \frac{b_{l+1} - b_l - 1}{2} (1 + \log(2\pi\sigma_l)) \quad \text{equation (9)}$$

The BIC for boundary selection can be applied in a coarse-to-fine framework (i.e. as K decreases). At each scale K, newly detected boundaries are tested using expression (7), and boundaries for which the left hand side of expression (7) is greater than the right hand side of expression (7) are added to selected boundaries as shown in FIG. 6.

It is envisaged that one having skill in the art can utilize improved density estimates to further enhance effectiveness of BIC for temporal clustering or segmentation of digital photographs. For example, BIC can be used in conjunction with other probabilistic models that are more sophisticated or accurate including mixture models.

Table 1 compares computational run time for processing multi-scale similarity analysis (Confidence) compared with DP and BIC methods, for several values of N. In addition, Table 1 gives run time required to construct a set of candidate event boundaries, B (Detection), which is included in Table 1.

TABLE 1

| | Run times (sec) | | | |
|---|---|---|---|---|
| N | Detection | BIC | DP | Confidence |
| 500 | 0.017423 | 0.016808 | 0.016808 | 0.183231 |
| 1000 | 0.034846 | 0.036077 | 0.039077 | 0.563115 |
| 2000 | 0.076923 | 0.081731 | 0.128615 | 1.908038 |
| 4000 | 0.161077 | 0.179077 | 0.593769 | 8.718769 |
| 6030 | 0.271654 | 0.260231 | 1.459115 | 19.594962 |

Table 1 illustrates variation in document run times for different size photograph collections, where event clustering has been implemented in Java, and times here were produced using a personnel computer with a 2.66 GHz Pentium 4 processor. After doubling the number of photographs processed (N), time for the boundary detection increases linearly, while including "Confidence" incurs a quadratic cost. The times in Table 1 are averages over 25 runs. An imprecision in timing given the short duration of calculation is responsible for producing the results for N=500 in Table 1, where DP or BIC processing takes less time than "Detection" alone.

The computational complexity of constructing a set of boundaries using multi-scale similarity analysis (Confidence) can be compared with DP and BIC methods. Generally, elements of a similarity matrix are zero far from the main diagonal, that is when |i-j| is large. Therefore to reduce storage and computation requirements, only a portion of a similarity matrix around the main diagonal is computed, The set of novelty scores computed using similarity matrices with varying specified values of K are then calculated. However, evaluation of "Confidence" potentially necessitates computation of the entire similarity matrix, since the extent of events can't be assumed in advance. In a worst case, this includes all $N^2$ terms of a similarity matrix. Because a temporal similarity measure decays exponentially as time difference increase, complexity can be reduced by using a mask, which zeros out elements of a matrix corresponding to photograph pairs taken far apart in time. Other heuristics can also be used to construct masks based on the number of photos taken between a pair of photos. Nonetheless, a worst-case complexity of $O(N^2)$ using "Confidence" is substantially greater than that of boundary detection.

The methods based on DP and BIC both offer significantly reduced complexity of calculation. The DP-based peak selection can be of $O(\beta^2)$ where $\beta<N$, where $\beta$ is governed by the smallest scale in K. Table 1 suggests that DP can be roughly ten times faster than similarity-based peak selection for all values N tested. Computing costs of equation (3) accounts for two thirds of the total processing time in the DP-based method. The BIC-based method offers even more substantial computational savings, where 0(β) tests using expression (7) are performed. The computation of sample means and variances of 0(N·M), dominates total BIC method cost.

Figure 7:
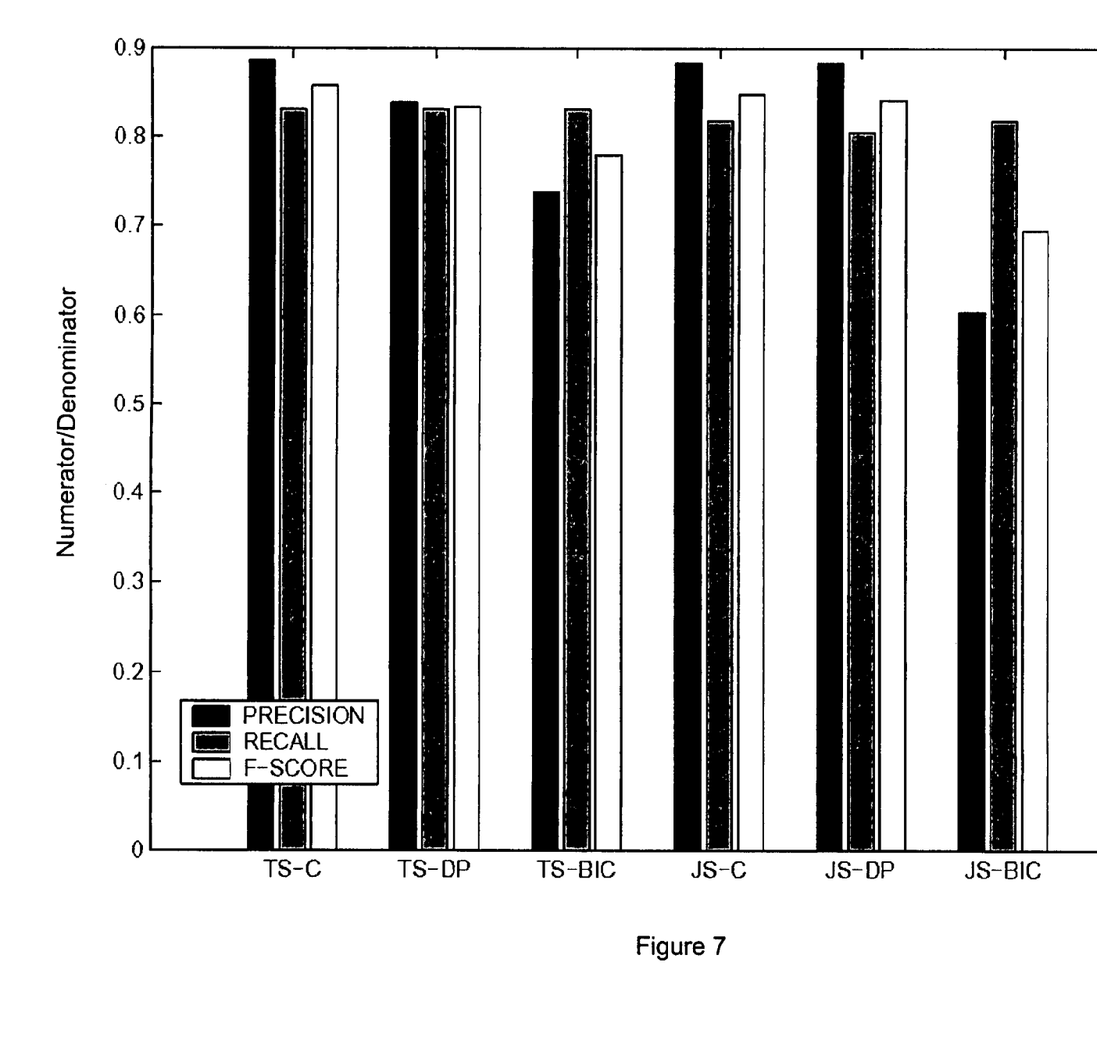
FIG. 7 illustrates a comparison between the precision, recall and F-score for different algorithms with similarity based confidence (C), BIC, and DP, using temporal similarity (TS) or joint temporal and content-based similarity (JS).

Both DP and BIC methods perform competitively with the original similarity-based confidence score. FIG. 7 shows the cumulative results of experimental testing using two photo collections manually clustered by the respective photographers and using measures given in equations (10), (11) and (12).

$$Precision = \frac{\text{correctly detected boundaries}}{\text{total number of detected boundaries}} \quad \text{equation (10)}$$

$$Recall = \frac{\text{correctly detected boundaries}}{\text{total number of ground truth boundaries}} \quad \text{equation (11)}$$

$$Fscore = \frac{2 \times Precision \times Recall}{Precision + Recall} \quad \text{equation (12)}$$

Event-clustering performance for temporal (TS) and joint temporal and content-based similarity (JS) are reported with each of the three boundary selection techniques (Similarity based confidence, DP and BIC). As such the JS uses both a meta-data tag such as time together with a content-based parameter such as file size to generate similarity analysis based boundaries. For the JS results reported here, we used low order discrete cosine transform (DCT) coefficients as content-based features. The similarity-based confidence results are denoted by TS-C and JS-C, DP-based results by TS-DP and JS-DP, and BIC-based results by TS-BIC and JS-BIC. Although, DP and BIC accelerated versions of temporal algorithms perform at a high level, temporal-similarity-based confidence (TS-C) achieves a maximal cumulative F-Score of all the methods examined, as shown in Table 2. Of the accelerated methods, DP appears to be superior to BIC-based peak selection, particularly with respect to Precision. The three boundary selection techniques thus demonstrate a tradeoff between computational complexity and performance.

Table 2 illustrates a boundary selection performance with similarity-based confidence (C), BIC, and DP, using temporal similarity (TS) and joint temporal and content-based similarity (JS).

TABLE 2

| Algorithm | Precision | Recall | F-Score |
|---|---|---|---|
| TS-C | 0.8857 | 0.8304 | 0.8571 |
| TS-DP | 0.8448 | 0.7828 | 0.8126 |
| TS-BIC | 0.7374 | 0.8304 | 0.7811 |
| JS-C | 0.8829 | 0.8182 | 0.8493 |
| JS-DP | 0.8523 | 0.7768 | 0.8128 |
| JS BIC | 0.8709 | 0.8179 | 0.8436 |

What is claimed is:

1. A method for temporal event clustering of a collection of data files comprising:
   (a) extracting one or more elements selected from the group of time stamp, global positioning satellite data, file size, file type, file name, text annotations, audio annotations, low level features from a meta-data tag headers or contents of each of the data files;
   (b) generating one or more similarity matrices based on comparing the extracted one or more elements of at least one data file with the extracted element from the data file or one or more neighboring data files;
   (c) determining one or more initial boundary partitions by applying one or more kernel functions of different extent L to the similarity matrices;
   (d) using one or more algorithms to select one or more boundaries from those determined in step (c); and
   (e) organizing the data files based on the selected boundaries.

2. The method of claim 1, wherein at least one of the one or more algorithms in step (d) is a dynamic programming algorithm.

3. The method of claim 2, wherein the dynamic programming method in step (d) utilizes cost measure L* as given by $$L^* = \underset{2 \le m \le \beta - 1}{\text{argmax}} \left\{ \frac{E_F(\beta, m)}{E_F(\beta, m+1)} \right\}$$

to determine the optimal number of clusters.

4. The method of claim 2, wherein the data files comprise digital photographs.

5. The method of claim 4, wherein the extracted element is a time-stamp.

6. The method of claim 5, wherein the time-stamp extracted from each digital photograph is used to order the photographs based on time order.

7. The method of claim 1, wherein at least one of the one or more algorithms in step (d) is a Bayes information criterion algorithm.

8. The method of claim 7, wherein the Bayes information criterion is used to test each boundary iteratively.

9. The method of claim 7, wherein the data files comprise digital photographs.

10. The method of claim 9, wherein the extracted element is a time-stamp.

11. The method of claim 10, wherein the time-stamp extracted from each digital photograph is used to order the photographs based on time order.

12. A method for temporal event clustering of a plurality of digital photographs comprising:
   (a) extracting a time stamp (t) for each of the photographs $t_n$, where N is the number of photographs in the collection and n=1, ... N;
   (b) ordering the photographs based on the time stamp in time order, such that $t_1 < t_2 < t_3 < ... < t_N$;
   (c) calculating one or more similarity values based on the time stamp extracted from each of the digital photographs compared with the time stamp extracted from the digital photograph or one or more neighboring digital photographs;
   (d) generating one or more similarity matrices based on the similarity values;
   (e) applying one or more kernel functions of different extent L to the similarity matrices to generate one or more novelty scores for each L;
   (f) determining one or more initial partitions from the novelty scores;
   (g) using one or more algorithms to select one or more boundaries from those determined in steps (e) and (f); and
   (h) organizing the photographs into at least two clusters based on the selected boundaries.

13. The method of claim 12, wherein at least one of the one or more algorithms in step (g) is a dynamic programming algorithm.

14. The method of claim 12, wherein at least one of the algorithms in step (g) comprises the steps of:
  (i) building a partition that divides the collection of photographs into 2 clusters;
  (j) generating an additional boundary such that the additional boundary divides the collection of photographs into L clusters, where L>2;
  (k) selecting the optimal partitions with m boundaries based on the optimal partitions with m−1 boundaries and the additional boundary;
  (l) repeating steps (j) and (k) for increasing L, where L<N;
  (m) selecting an optimal number of clusters L*; and
  (n) identifying one or more boundaries by tracing back from the optimal partitions for the optimal number of clusters.

15. The method of claim 14, wherein the optimal number of clusters L* in step (m) is calculated as $$\underset{2 \le m \le \beta - 1}{\operatorname{argmax}} \left\{ \frac{E_F(\beta, m)}{E_F(\beta, m+1)} \right\}.$$

16. The method of claim 12, wherein at least one of the one or more algorithms in step (g) is a Bayes information criterion algorithm.

17. The method of claim 16, wherein the Bayes information criterion is used to test each boundary iteratively.

18. The method of claim 12, wherein at least one of the one or more algorithms in step (g) comprises the steps of:
  (j) generating $$L(b_1, b_{1+1}) = \frac{b_{l+1} - b_l - 1}{2}(1 + \log(2\pi\sigma_l)); \text{ and}$$

(k) selecting boundary partitions in the selected set of optimum boundary partitions if the term $L(b_{l-1}, b_l) + L(b, b_{l+1})$ exceeds the term $$L(b_{l-1}, b_{l+1}) + \frac{\lambda}{2}\log(b_{l+1}, b_{l-1}).$$

19. The method of claim 12, wherein the method is carried out using a system or apparatus for ordering the collection of digital photographs comprising:
  (a) one or more processors capable of:
    (i) extracting time stamps from each digital photograph data file;
    (ii) ordering the time stamps in chronological order;
    (iii) generating initial boundaries for clustering the photograph collection;
    (iv) selecting a subset of the list of boundaries generated in step (a)(iii) with the use of at least one algorithm; and
    (v) ordering the collection of digital photographs based on the selected subset of boundaries;
  and
  (b) a machine readable medium including operations stored thereon that when processed by the one or more processors cause a system to perform the steps of:
    (i) creating a list of the photographs;
    (ii) ordering the list of photographs in chronological order;
    (iii) creating initial boundaries for clustering the photograph collection;
    (iv) selecting a subset of the list of boundaries generated in step (b)(iii) with the use of at least one algorithm; and
    (v) classifying the collection of digital photographs based on the selected boundaries.

20. The method of claim 19, wherein selecting a list of boundaries with at least one algorithm is accomplished by using a dynamic programming algorithm.

21. The method of claim 19, wherein selecting a list of boundaries with at least one algorithm is accomplished by calculating a Bayes information criterion.

22. A program executable by a computer to perform a function of ordering a collection of digital photographs comprising the steps of:
  (a) extracting a time-stamp from at least one meta-data tag element of each of the photographs;
  (b) ordering the collection of digital photographs based on the time-stamps;
  (c) calculating one or more boundaries in the collection of photographs based on comparing the time stamps of one or more photographs to the time-stamps of the photograph or one or more neighboring photographs in the collection of photographs;
  (d) using an algorithm to select a subset of the boundaries calculated in step (c); and
  (e) ordering the collection of photographs based on the selected boundaries.

23. The program of claim 22, wherein a dynamic programming algorithm is used in step (d).

24. The program of claim 22, wherein a Bayes information criterion algorithm is used in step (d).

* * * * *

UNITED STATES PATENT AND TRADEMARK OFFICE
CERTIFICATE OF CORRECTION

PATENT NO. : 7,640,218 B2  Page 1 of 1
APPLICATION NO. : 11/037378
DATED : December 29, 2009
INVENTOR(S) : Cooper et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1382 days.

Signed and Sealed this

Ninth Day of November, 2010

David J. Kappos
*Director of the United States Patent and Trademark Office*